United States Patent
Kolesnikov et al.

(10) Patent No.: US 10,628,516 B2
(45) Date of Patent: Apr. 21, 2020

(54) PROGRESSIVE RENDERING OF DATA SETS

(71) Applicant: Facebook, Inc., Menlo Park, CA (US)

(72) Inventors: Vladimir Kolesnikov, Redwood City, CA (US); Andrew Chien, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 286 days.

(21) Appl. No.: 15/494,311

(22) Filed: Apr. 21, 2017

(65) Prior Publication Data

US 2017/0228347 A1     Aug. 10, 2017

Related U.S. Application Data

(63) Continuation of application No. 13/672,495, filed on Nov. 8, 2012, now Pat. No. 9,665,353.

(51) Int. Cl.
| | |
|---|---|
| *G06F 3/0482* | (2013.01) |
| *G06F 17/21* | (2006.01) |
| *G06F 8/38* | (2018.01) |
| *G06F 3/0481* | (2013.01) |
| *G06F 17/22* | (2006.01) |
| *G06F 3/0485* | (2013.01) |

(52) U.S. Cl.
CPC .......... *G06F 17/211* (2013.01); *G06F 3/0481* (2013.01); *G06F 3/0482* (2013.01); *G06F 8/38* (2013.01); *G06F 17/2247* (2013.01); *G06F 3/0485* (2013.01)

(58) Field of Classification Search
CPC .................................................... G06F 3/0482
See application file for complete search history.

(56) References Cited

U.S. PATENT DOCUMENTS

| | | | | |
|---|---|---|---|---|
| 8,489,984 | B1* | 7/2013 | Violet | ........................ G06F 8/34 715/209 |
| 8,713,004 | B1* | 4/2014 | Hands | ................. G06F 16/9537 707/727 |
| 2005/0210410 | A1* | 9/2005 | Ohwa | ................... G06F 3/0482 715/821 |
| 2006/0026512 | A1* | 2/2006 | Hays | ..................... G06F 17/217 715/251 |
| 2006/0031760 | A1* | 2/2006 | Jacobs | .................... G06F 16/93 715/251 |

(Continued)

OTHER PUBLICATIONS

Omni, "Messaging Products," Oct. 17, 2010, https://web.archive.org/web/20101017232236/http://www.omni-ts.com/crm-integration/screenshots.html.*

(Continued)

*Primary Examiner* — Ryan Barrett
(74) *Attorney, Agent, or Firm* — Baker Botts L.L.P.

(57) ABSTRACT

In one embodiment, a computing device may estimate an average dimension of several content objects. The estimation may be based on one or more calculated dimensions of one or more previously rendered content objects. The computing device may determine a first number of content objects to render for display within an area of a graphical user interface (GUI). This determination may be based at least on the average dimension of the content objects and a maximum dimension along an axis of the GUI. The computing device may also render the first number of content objects for display along the axis. The computing device may also display the first number of content objects within the area of the GUI.

20 Claims, 5 Drawing Sheets

(56) References Cited

U.S. PATENT DOCUMENTS

| | | | |
|---|---|---|---|
| 2006/0150092 A1* | 7/2006 | Atkins | G06Q 10/043 |
| | | | 715/251 |
| 2006/0209093 A1* | 9/2006 | Berker | G06F 17/211 |
| | | | 345/660 |
| 2006/0236230 A1* | 10/2006 | Lin | G06F 17/211 |
| | | | 715/210 |
| 2007/0136268 A1* | 6/2007 | Qureshi | G06F 16/958 |
| 2007/0186182 A1* | 8/2007 | Schiller | G06F 16/957 |
| | | | 715/781 |
| 2008/0155427 A1* | 6/2008 | Leblay | G06F 16/9574 |
| | | | 715/744 |
| 2008/0256439 A1* | 10/2008 | Boreham | G06F 17/211 |
| | | | 715/246 |
| 2008/0267505 A1* | 10/2008 | Dabet | G06F 17/243 |
| | | | 382/181 |
| 2008/0282147 A1* | 11/2008 | Schorr | G06F 17/212 |
| | | | 715/247 |
| 2009/0307586 A1* | 12/2009 | Carter | G06F 3/0481 |
| | | | 715/700 |
| 2010/0077355 A1* | 3/2010 | Belinsky | G06F 3/0482 |
| | | | 715/835 |
| 2010/0131314 A1* | 5/2010 | Lo Yuk Ting | G06Q 10/00 |
| | | | 705/7.11 |
| 2011/0078598 A1* | 3/2011 | Barak | G06F 16/9577 |
| | | | 715/765 |
| 2011/0154190 A1* | 6/2011 | Schorr | G06F 17/212 |
| | | | 715/251 |
| 2012/0194519 A1* | 8/2012 | Bissell | G06F 16/9577 |
| | | | 345/428 |
| 2012/0260157 A1* | 10/2012 | Zhu | H04L 67/1095 |
| | | | 715/234 |
| 2014/0122995 A1* | 5/2014 | Beckmann | G06F 16/958 |
| | | | 715/234 |
| 2014/0143648 A1* | 5/2014 | Kolesnikov | G06Q 50/01 |
| | | | 715/234 |
| 2015/0220232 A1* | 8/2015 | Smith | G06F 3/0484 |
| | | | 715/784 |
| 2016/0104202 A1* | 4/2016 | Greenberg | G06Q 30/0643 |
| | | | 705/14.64 |
| 2018/0217730 A1* | 8/2018 | Hauser | G06F 3/0485 |

OTHER PUBLICATIONS

Harkins, "Two Ways to Find a Conditional Average in Excel," Jul. 30, 2012, https://www.techrepublic.com/blog/windows-and-office/two-ways-to-find-a-conditional-average-in-excel/.*

Samadi et al, "Learning from Multiple Heuristics," AAAI'08 Proceedings of the 23rd national conference on Artificial intelligence, vol. 1 pp. 357-362, Jul. 13-17, 2008.*

* cited by examiner

PROGRESSIVE RENDERING OF DATA SETS

PRIORITY

This application is a continuation under 35 U.S.C. § 120 of U.S. patent application Ser. No. 13/672,495, filed 8 Nov. 2012.

TECHNICAL FIELD

This disclosure generally relates to graphical user interface.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

A computing device may render content objects along a vertical direction in an area within a graphical user interface in response to a scrolling event associated with the graphical user interface. Instead of first calculating a height for each individual content object, in particular embodiments, the computing device may determine a particular number of content objects to be rendered in the area based on an assumed height for every content object and a maximum height for the area. The computing device may further improve estimation on the number of content objects to be rendered in the area based on actual dimensions of previously rendered content objects.

DESCRIPTION OF EXAMPLE EMBODIMENTS

Figure 1:
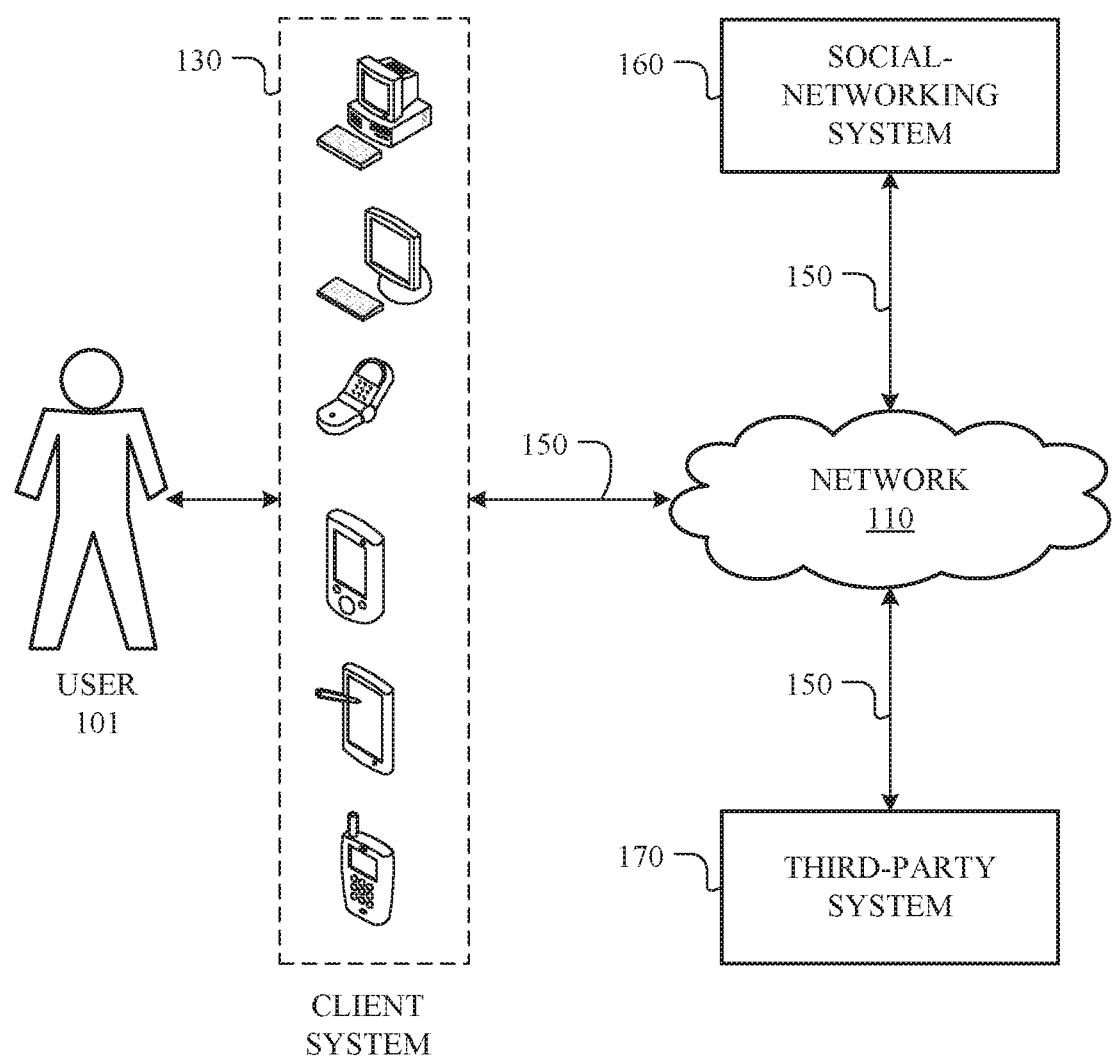
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host websites or applications. Third-party system 170 may generate, store, receive, and transmit third-party system data, such as, for example and without limitation, web pages, text, images, video, audio, or applications. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
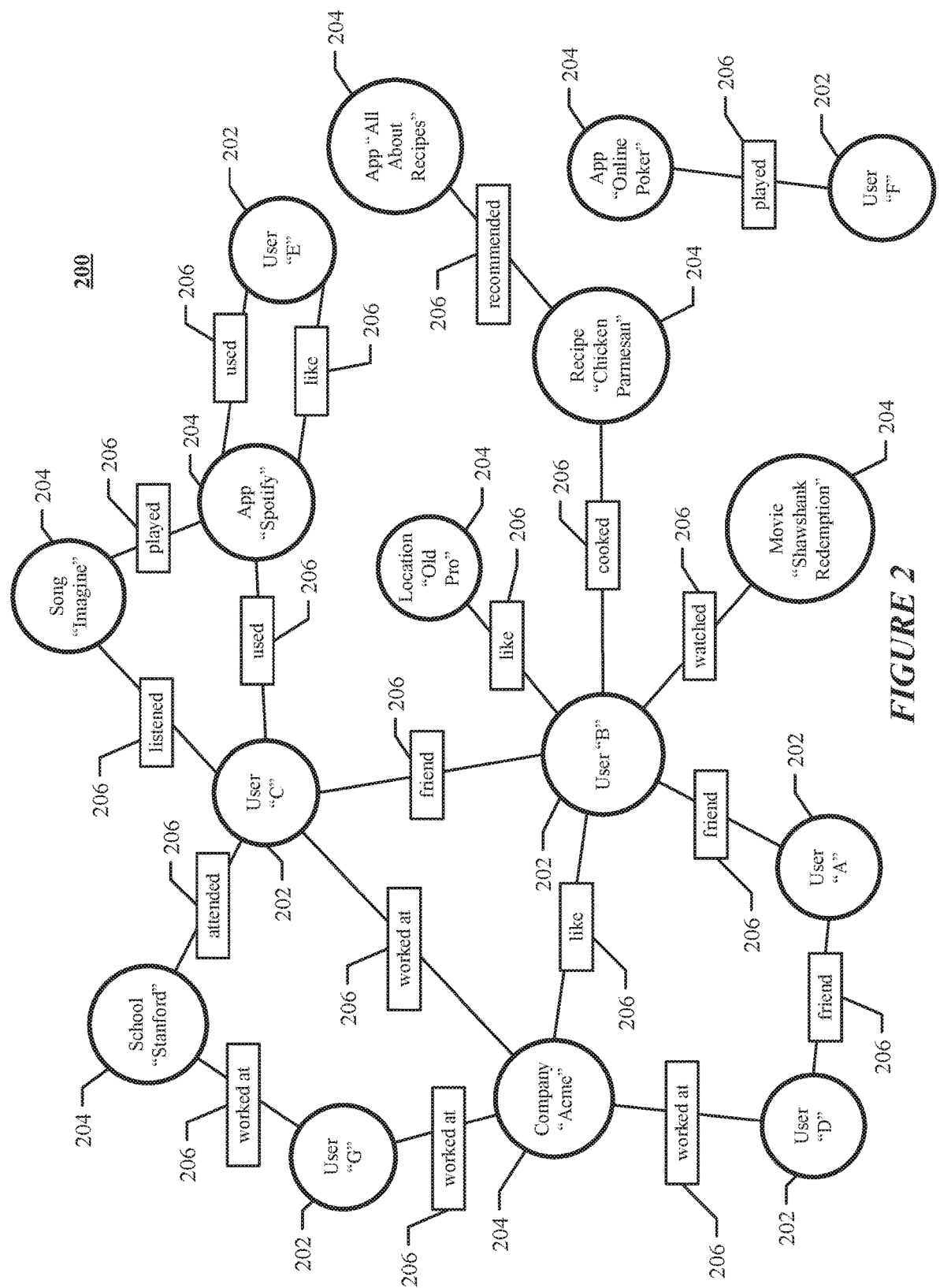
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In addition, the degree of separation between any two nodes is defined as the minimum number of hops required to traverse the social graph from one node to the other. A degree of separation between two nodes can be considered a measure of relatedness between the users or the concepts represented by the two nodes in the social graph.

As described earlier, each time a user performs an activity or action (e.g., "like") on an item or object supported by a social-networking system or a third-party system, the social-networking system may record the action. For example the social-networking system may automatically create in a social graph an edge (e.g., an "like" edge) between a user node corresponding to the user and a node corresponding to the item or object, and store the edge in a data store. Therefore, the social-networking system may record many actions performed by different users of the social-networking system at different times.

The social-networking system may provide to a user frequently update content based on recorded activities or actions that may be related to the user. In particular embodiments, the social-networking system may support a news-feed service. In particular embodiments, a news feed may comprise a data format including one or more news-feed stories. Each news-feed story may include content related to a specific subject matter or topic. In particular embodiments, the social-networking system may aggregate activities or actions related to a specific user action into a news-feed story. For example, a first user may post a photo to the social-networking system, while other users of the social-networking system may perform various activities or actions related to the photo. Other users may "like" the photo, post comments related to the photo, or tag one or more particular users to the photo. The social-networking system may aggregate activities related to the photo into a news-feed story comprising an image of the photo, a profile picture of the first user, a count of "likes" of the photo by other users, and one or more comments related to the photo. As for another example, a first user may checks in to a webpage (maintained by the social-networking system or a third-party system) corresponding to a place (e.g., a landmark, a restaurant, a department store). Other users of the social-networking system may "like" the check-in activity, or post comments related to the check-in activity. The social-networking system may aggregate activities related to the check-in activity into a news-feed story comprising a link and an image of the webpage, a profile picture of the first user, a count of "likes" of the check-in activity by other users, and one or more comments related to the check-in activity. The social-networking system may also aggregate into the news-feed story update to the webpage, or advertising related to the webpage (e.g., on-line coupons from a business related to the webpage). In particular embodiments, the social-networking may present a news feed including one or more news-feed stories to a viewing user. For example, an application (e.g., a web browser) hosted by a client device of the viewing user may retrieve a news feed from the social-networking system and display the news feed in the application's user interface. The application may display each news-feed story in the news feed in a respective frame (e.g., an HTML iFrame) in the application's user interface.

The social-networking system may aggregate activities or actions into news-feed stories based on social-graph information. For example, the social-networking system may aggregate for a viewing user a news feed including news-feed stories related to activities or actions performed by users who are within a specified degree of separation (e.g., within two degrees of separation) from the viewing user on the social graph. The social-networking system may aggregate activities or actions into news-feed stories based on privacy settings. For example, a user may specify which other users can access information of a particular activity performed by the user. The social-networking system may aggregate for a viewing user a news feed including news-feed stories related to activities accessible to the viewing user.

A structured document such as a web page may include, for example, page layout information (e.g., frames), scripts, page content such as text (e.g., ASCII or HTML), media data (e.g., images, video clips, or animations), and executable code objects (e.g., a game executable within a browser window or frame). Structured documents may be implemented with languages and technologies such as Hypertext Markup Language (HTML), Extensible Markup Language (XML), Extensible Hypertext Markup Language (XHTML), JavaScript, WebGL, Cascading Style Sheet (CSS) including CSS animations and transitions, and, frequently, Java. A structured document may itself include references to multiple structured documents and contents. For example, a web page may include one or more inline references by incorporating Uniform Resource Locations (URL's) or script code (e.g., JavaScript, PHP, or AJAX) that in response to a user event (e.g., a mouse click, a mouse hover-over), causes an application displaying the web page in a graphical user interface to dynamically retrieve content specified by an URL and the script code.

A layout engine (or web browser engine) is a software component or library for rendering structured documents in a graphical user interface. For example, Google's Chrome web browser and Apple's Safari web browser use WebKit software to render web pages. WebKit includes a layout engine WebCore and a JavaScript engine JavaScriptCore (for interpreting and executes JavaScript code). An application hosted by a computing device may utilize a layout engine to render structured documents by incorporating modules in the layout engine via an application programming interface (API) to the layout engine.

When a user views a structured document (or a file in any suitable representation) with a large amount of content (e.g., text, or media data) in a graphical user interface of an application, the application may render only content to be displayed within the graphical user interface. It is desirable to fetch (e.g., from a remote data store) and render a proper amount of content to be displayed in the graphical user interface. For example, rendering too little amount of content within the graphical user interface may degrade user experience (e.g., boxes with empty content may be shown in the graphical user interface). Rendering too much amount of content in addition to content displayed within the graphical user interface may also deteriorate user experience (e.g., choppy scrolling, frozen screen) due to limited available hardware resources (e.g., main memory space, network bandwidth). Particular embodiments describe methods for rendering content objects in a graphical user interface. Particular embodiments may improve rendering performance by continuously estimating a size of content objects to be displayed in the graphical user interface.

Figure 3:
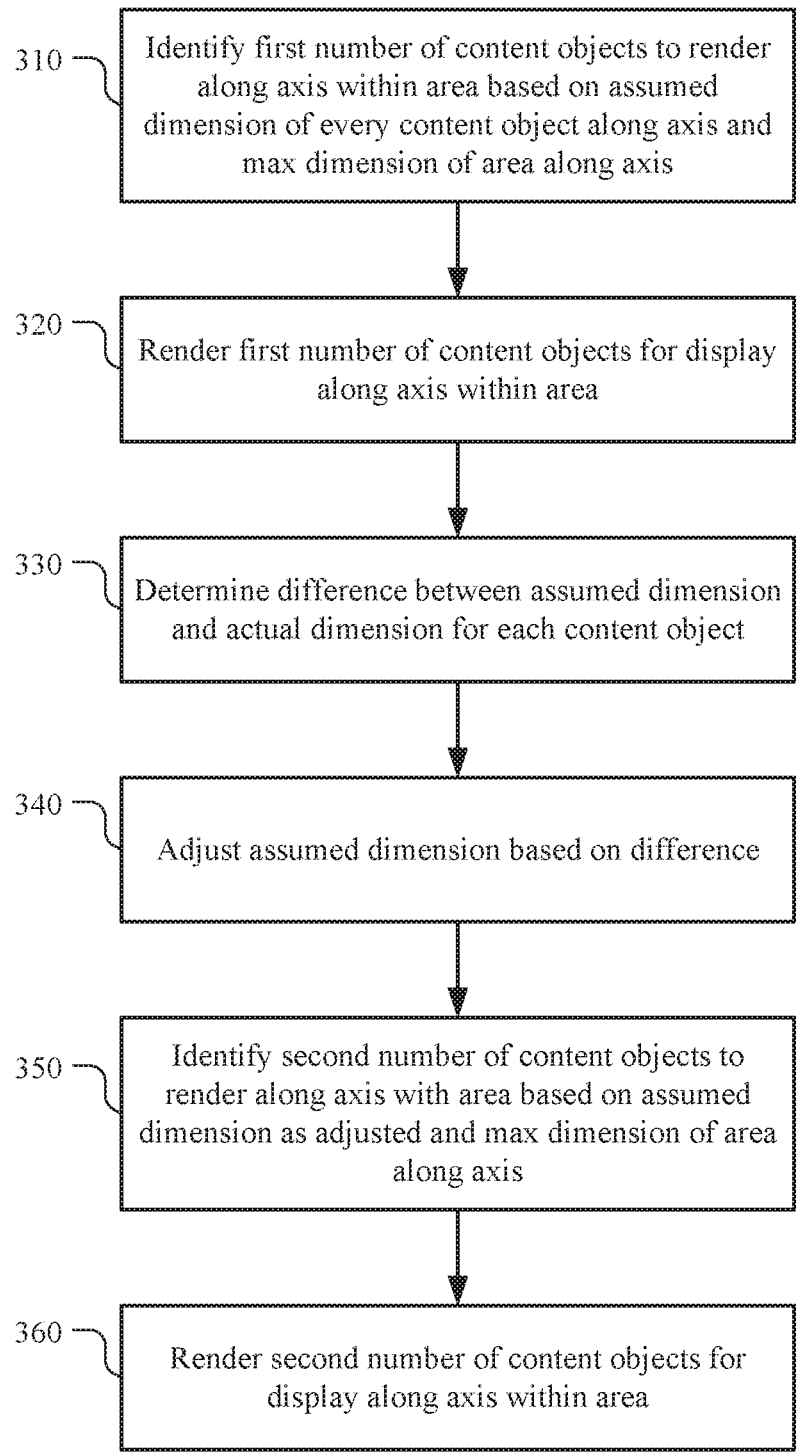
FIG. 3 illustrates an example method for rendering content objects in a graphical user interface.

FIG. 3 illustrates an example method 300 for rendering content objects in a graphical user interface. The example method of FIG. 3 may be implemented by a computing device. A computing device may be a desktop computer, a laptop computer, a tablet computer, a smartphone, or any suitable computing device with a display. For example, the example method of FIG. 3 may be implemented by an application (or a process of an application) executed by one or more processors of the computing device. The example method 300 may begin at step 310. In particular embodiments, at step 310, the computing device may identify a first number of content objects to render for display along an axis within an area of a graphical user interface (GUI) of the computing device. The computing device may identify the first number based on an assumed dimension of every content object along the axis and the maximum dimension of the area along the axis. In particular embodiments, at step 320, the computing device may render the first number of content objects for display along the axis within the area.

Figure 4:
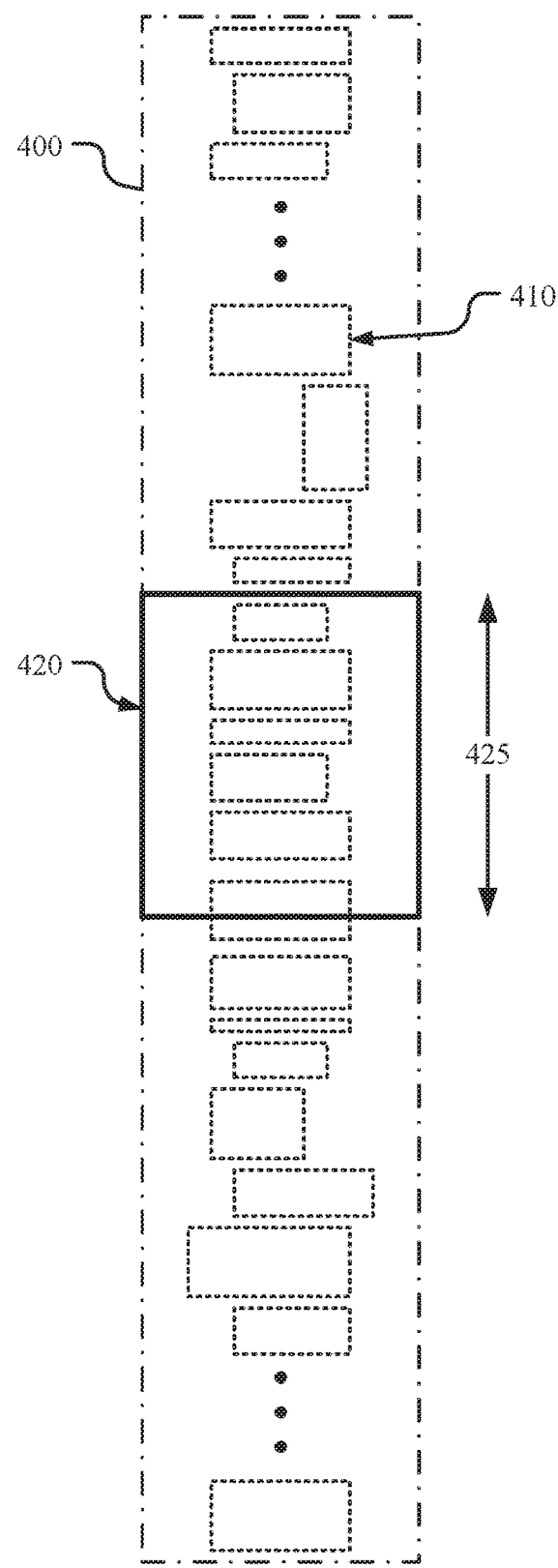
FIG. 4 illustrates example content objects arranged in a column in a vertical direction.

FIG. 4 illustrates example content objects arranged in a column in a vertical direction. FIG. 4 illustrates a structured document 400 (e.g., a web page) comprising a plurality of content objects 410 while a portion of the content objects 410 is displayed within an area 420 of a graphical user interface of an application hosted by the computing device. A content object 410 may be text, media data (e.g., an image, a video clip), or an executable code object (e.g., an application). A content object 410 may be a frame (e.g., based on HTML <div> or <iframe> tag). A content object may be a message. A content object 410 may be a status update (e.g., a user's post to a his/her profile page) or news-feed story as described earlier. Although a structured document (400) is illustrated in the example of FIG. 4, this disclosure contemplates any suitable collection of content objects. For example and without limitations, content objects may be included in a file represented in Portable Document Format (PDF) or Tagged Image File Format (TIFF). In the example of FIG. 4, a user may scroll up or down the structured document 400 in the vertical direction. The computing device may first determine an assumed height of every content object 410 in the vertical direction. For example, the assumed height may be a pre-determined number (e.g., 200 pixels). For another example, the assumed height may be an average height of the content objects 410 in the structured document 400. The computing device may identify a first number of content objects 410 to render for display in the area 420 based on the assumed height and a maximum height 425 of the area in the vertical direction. For example, if the assumed height is 50 pixels and the maximum height 425 is 1000 pixels, the first number may be 20 (1000 divided by 50). The computing device may then render 20 content objects 410 in the vertical direction (arranged in a column) in the area 420. That is, instead of first calculating an actual height for each of the content object 410, the computing device may first estimate an average height for the content objects 410, determine a particular number of content objects 410 that may be fitted into the area 420 in the vertical direction, and render the particular number of content objects 410 to be displayed in the area 420.

As content objects are rendered for display along the axis within the area at step 320, each rendered content object may have an actual dimension along the axis (which may be different from the assumed dimension). Particular embodiments may improve estimation on the number of content objects to be rendered in the area based on the actual dimensions of the rendered content objects. In particular embodiments, at step 330, the computing device may determine a difference between the assumed dimension and actual dimensions. In particular embodiments, at step 340, the computing device may adjust the assumed dimension based at least in part on the difference. For example, in the example of FIG. 4 described above, the computing device may calculate a difference between the assumed height 50 pixels and an actual height of each of the 20 content objects rendered, determine an average difference (e.g., by first summing all the differences and then dividing the sum by 20), and adjust the assumed height by adding the average difference to the assumed height. For example, if the average difference is +10 pixels, the computing device may adjust the assumed height to 60 pixels (60=50+10). If the average difference is −8 pixels, the computing device may adjust the assumed height to 42 pixels (42=50−8). This disclosure contemplates any suitable methods for adjusting the assumed dimension based on the actual dimensions of the content objects that are rendered in the area along the axis. For example, the computing device may adjust the assumed dimension by using an average of the actual dimensions of the content objects that are already rendered in the area along the axis as the adjusted assumed dimension.

In particular embodiments, at step 350, the computing device may identify a second number of content objects to be rendered for display along the axis within the area of the GUI. The computing device may identify the second number based on the assumed dimension as adjusted and the maximum dimension of the area along the axis. In particular embodiments, at step 360, the computing device may render the second number of content objects for display along the axis within the area. For example, in the example of FIG. 4 described above, if the adjusted assumed height is 60 pixels, the second number may be 17 (one plus the quotient of division of the maximum height of the area 1000 pixels by the adjusted assumed height 60 pixels). The computing device may then render 17 content objects 410 in a column in the area 420.

In some embodiments, the computing device may determine an assumed dimension of a content object along an axis based on a type of the content object. For example, the area 420 illustrated in FIG. 4 may be a graphical user interface of a messaging application. Each content objects 410 illustrated in FIG. 4 may comprise one of three types of content objects: a message, a message with an image, or a time delimiter (e.g., "JAN 12, 2011", "TUE, 12:36 PM"). For example, the computing device may assign an assumed height of 30 pixels to a content object 410 if the content object is a time delimiter. The computing device may assign an assumed height of 200 pixels to a content object 410 if the content object is a message with an image. If the content object 410 is a message, the computing device may calculate an assume height for the content object by multiplying a number of lines in the message (e.g., a number of characters in the message divided by an average number of characters per line such as 40) by a height for each line of characters (e.g., 24 pixels). The computing device may also add to the assume height for the content object a padding height (e.g., 10 pixels). As described earlier, the computing device may render for display in the area 420 a first number of the content objects 410 in the vertical direction based on the assumed heights (e.g., 30 pixels for a time delimiter, 200 pixels for a message with an image, and so on).

The computing device may determine, for each content object type, a difference between the assumed height and actual heights of rendered content objects. The computing device may adjust the assumed height (for each content object type) based on at least in part on the difference. The computing device may also adjust the assumed height (for each content type) based on heuristics. For example, if the average height for rendered time delimiters is within +/−5 pixels from 30 pixels, then the computing device may keep the assumed height as the adjust assumed height for content objects 410 of the delimiter type (i.e., no additional adjusting). For another example, if the average height for rendered messages is different from the assumed height for content objects 410 of the message type, the computing device may adjust the assumed height for content objects 410 of the message type by adjusting the average number of characters per line, or by adjusting the height for each line of characters described above. The computing device may also assign the average height as the adjusted assumed height for content objects 410 of the message type. In one embodiment, the computing device may adjust the assumed height (for each content object type) based on a machine learning algorithm. The computing device may then determine a second number of content object 410 to render for display in the area 420 in the vertical direction based on the adjusted assumed heights (for each content object type), and render in the area 420 the second number of content objects 410 in a column in the vertical direction.

Although the example of FIG. 4 illustrates rendering content objects for display in the vertical direction, this disclosure contemplates any suitable directions. For example, a user of the computing device may scroll horizontally a collection of content objects arranged in a row that are displayed in an area within a graphical user interface. The computing device may first determine an assumed width for each of content objects in the horizontal direction (e.g., 300 pixels). The computing device may identify a first number of content objects to render for display in the area based on the assumed width and the maximum width of the area in the horizontal direction, and render in the area the first number of content objects arranged in a row in the horizontal direction. The computing device may determine a difference between the assumed width and actual widths of content objects just rendered in the area, and adjust the assumed width based on the difference. The computing device may then determine a second number of content objects to render for display in the area in the horizontal direction based on the adjusted assumed width and the maximum width of the area, and render in the area the second number of content objects arranged in a row in the horizontal direction.

The computing device may execute the example method of FIG. 3 in response to a user event. For example, the computing device may, in response to a scrolling event along an axis associated with the GUI, render and display in the GUI a particular number of content objects based on the assumed dimension of every content objects and the maximum dimension of the area within the GUI along the axis as described in the example method of FIG. 3. The computing device may continue adjusting the assumed dimension along the axis and a number of content objects to be rendered with the example method of FIG. 3, in response to each additional scrolling event along the axis. As the computing device determine a number of content objects to be displayed in the GUI (e.g., in response to a scrolling event), the computing device may fetch the content objects (e.g., from a remote server), and rendered the content objects to be displayed in the GUI. The computing device may improve rendering performance by utilizing multiple computing threads. Each thread may comprise a portion of instructions (for displaying the content objects) to be executed by at least one of the available processor of the computing device. For example, particular embodiments may comprise a worker thread for fetching and processing the content objects from a remote server, and a user-interface (UI) thread for rendering the content objects in the area within the GUI.

In particular embodiments, a first thread of execution (a worker thread) on the computing device may fetch and process from a data store separate from the computing device (i.e., a remote data store) the content objects to be rendered in the area within the GUI. For example, the first thread may access a website for content objects of a web page hosted by the website. For example, a content object may comprise a message, a status update, a news-feed story, or an advertisement provided by the social-networking system. An advertisement may comprise text, images, audio or video clips, or any suitable combinations of these, or in any suitable digital format. The first thread may access one or more data stores of the social-networking system and fetch the content object hosted by the social-networking system.

In particular embodiments, the first thread of execution may process a content object by creating a shadow of the content object. A shadow of the content object may be a copy of the content object fetched by the first thread. A shadow may comprise a list of one or more content objects fetched by the first thread. The first thread may also create (or update) a shadow of a content object by combining the content object fetched from the remote data store with data cached locally on the computing device that corresponds to the content object. For example, the content object may be a news-feed story comprising a text string (e.g., "Bob posted a photo"), an image (of the photo posted by Bob), a count of "likes", and one or more comments by users of the social-networking system. In response to a user event (e.g., a scrolling event, a mouse-over event), the first thread may fetch from a remote data store a new count of "likes" or one or more new user comments for the news-feed story. The first thread may create (or update) a shadow comprising the news-feed story by combining the new count of "likes" and new user comments with the text string, the image and user comments previously cached locally at the computing device. The first thread may also access the remote data store and determine a change of a content object. For example, the first thread may access the remote data store and determine that a particular user comment of the news-feed story has been removed (or has been edited) in the remote data store, and update the shadow by deleting the particular user comment from the shadow (or updating the particular user comment with the latest one fetched from the remote data store).

In particular embodiments, the first thread of execution may send one or more shadows to a second thread of execution (a UI thread) on the computing device, the second thread being separate from the first thread. The first thread may send a complete shadow to the second thread. The first thread may send to the second thread a portion of the shadow that is new to the second thread. In one embodiment, the second thread may create and update a shadow of a content object based on data (associated with the content object) fetched by the first thread. For example, the second thread may create a shadow of a news-feed story, and update the shadow with data fetched by the first thread (e.g., a new count of "likes", or an addition or deletion of a user comment as described earlier). That is, the second thread may keep "shadowing" new or changes of content objects as fetched by the first thread. In particular embodiments, the second thread of execution may render the content objects based at least in part on the shadows. For example, the second thread may update a content object with its corresponding shadow and render the update content object in the area within the GUI. By separating fetching and processing the content object (i.e., the first thread) from rendering the content objects (i.e., the second thread), particular embodiments may improve overall loading and rendering performance in displaying the content objects.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 5:
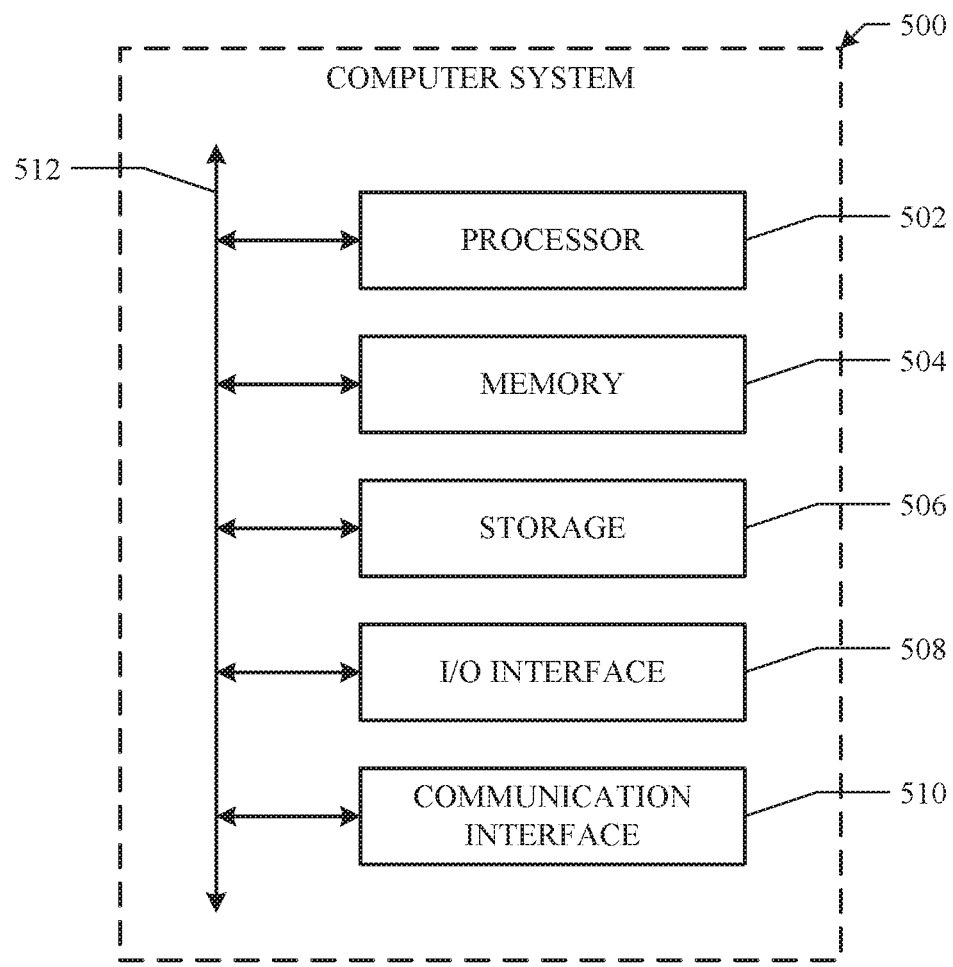
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, estimating an average dimension of a plurality of content objects to render for display, wherein the average dimension is estimated by adjusting assumed dimensions of the plurality of content objects based on actual dimensions of previously rendered content objects using two or more heuristic rules, and wherein the two or more heuristic rules are based at least on object types associated with the one or more previously rendered content objects and difference of the assumed dimensions of the plurality of content objects and the actual dimensions of the previously rendered content objects;

by the computing device, determining a first number of content objects to render for display within an area of a graphical user interface (GUI), wherein the determination is based at least on the estimated average dimension of the plurality of content objects and a maximum dimension along an axis of the GUI;

by the computing device, rendering the first number of content objects for display along the axis; and by the computing device, displaying the first number of content objects within the area of the GUI.

2. The method of claim 1, wherein:
the axis is vertical;
the maximum dimension of the area along the axis is a maximum height of the area;
the content objects are rendered for display in a column; and
the average dimension is an average height.

3. The method of claim 1, wherein:
the axis is horizontal;
the maximum dimension of the area along the axis is a maximum width of the area;
the content objects are rendered for display in a row; and
the average dimension is an average width.

4. The method of claim 1, wherein a content object comprises a message, status update, or a news-feed story.

5. The method of claim 1, executed by the computing device in response to a scrolling event associated with the GUI.

6. The method of claim 1, wherein:
a first thread of execution on the computing device fetches and processes for rendering the content objects from a data store separate from the computing device; and
a second thread of execution on the computing device renders the content objects, the second thread of execution being separate from the first thread of execution.

7. The method of claim 6, wherein processing of a content object for rendering comprises creating a shadow of the content object.

8. The method of claim 7, wherein creating the shadow of the content object comprises combining the content object with data cached locally on the computing device that corresponds to the content object.

9. The method of claim 1, wherein the content objects are associated with a structured document being rendered in the GUI.

10. The method of claim 1, wherein the two or more heuristic rules comprise a first heuristic rule associated with a first object type, further comprising:
determining that a first actual dimension of a first content object associated with the first object type is within a pre-determined threshold range to a first assumed dimension of the first object type; and
keeping the first assumed dimension as an adjusted dimension for the first object type.

11. The media of claim 10, wherein the two or more heuristic rules comprise a second heuristic rule associated with a second object type, further comprising:
determining that a second actual dimension of a second content object associated with the second object type is different from a second assumed dimension for the second object type; and
adjusting the second assumed dimension based on a difference between the second actual dimension of the second content object and the second assumed dimension of the second object type by adjusting one or more properties associated with the second object type.

12. One or more computer-readable non-transitory storage media embodying software that is operable when executed by a computing device to:
estimate an average dimension of a plurality of content objects to render for display, wherein the average dimension is estimated by adjusting assumed dimensions of the plurality of content objects based on actual dimensions of previously rendered content objects using two or more heuristic rules, and wherein the two or more heuristic rules are based at least on object types associated with the one or more previously rendered content objects and difference of the assumed dimensions of the plurality of content objects and the actual dimensions of the previously rendered content objects;
determine a first number of content objects to render for display within an area of a graphical user interface (GUI), wherein the determination is based at least on the estimated average dimension of the plurality of content objects and a maximum dimension along an axis of the GUI;
render the first number of content objects for display along the axis; and
display the first number of content objects within the area of the GUI.

13. The media of claim 12, wherein:
the axis is vertical;
the maximum dimension of the area along the axis is a maximum height of the area;
the content objects are rendered for display in a column; and
the average dimension is an average height.

14. The media of claim 12, wherein:
the axis is horizontal;
the maximum dimension of the area along the axis is a maximum width of the area;
the content objects are rendered for display in a row; and
the average dimension is an average width.

15. The media of claim 12, wherein a content object comprises a message, status update, or news-feed story.

16. The media of claim 12, wherein the software is executed by the computing device in response to a scrolling event associated with the GUI.

17. The media of claim 12, wherein:
a first thread of execution on fetches and processes for rendering the content objects from a data store separate from the computing device; and
a second thread of execution renders the content objects, the second thread of execution being separate from the first thread of execution.

18. The media of claim 17, wherein processing of a content object for rendering comprises creating a shadow of the content object.

19. The media of claim 18, wherein creating the shadow of the content object comprises combining the content object with data cached locally on the computing device that corresponds to the content object.

20. A system comprising: one or more processors; and a memory coupled to the processors comprising instructions executable by the processors, the processors being operable when executing the instructions to:
estimate an average dimension of a plurality of content objects to render for display, wherein the average dimension is estimated by adjusting assumed dimensions of the plurality of content objects based on actual dimensions of previously rendered content objects using two or more heuristic rules, and wherein the two or more heuristic rules are based at least on object types associated with the one or more previously rendered content objects and difference of the assumed dimensions of the plurality of content objects and the actual dimensions of the previously rendered content objects;

determine a first number of content objects to render for display within an area of a graphical user interface (GUI), wherein the determination is based at least on the estimated average dimension of the plurality of content objects and a maximum dimension along an axis of the GUI;

render the first number of content objects for display along the axis; and display the first number of content objects within the area of the GUI.

* * * * *